United States Patent
Holmes et al.

(10) Patent No.: US 7,823,073 B2
(45) Date of Patent: Oct. 26, 2010

(54) PRESENCE-BASED LOCATION AND/OR PROXIMITY AWARENESS

(75) Inventors: John S Holmes, Seattle, WA (US); Panchapagesan Seshagiri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 377 days.

(21) Appl. No.: 11/460,882

(22) Filed: Jul. 28, 2006

(65) Prior Publication Data

US 2008/0028063 A1 Jan. 31, 2008

(51) Int. Cl.
G06F 3/00 (2006.01)
G06F 3/048 (2006.01)
H04W 24/00 (2009.01)

(52) U.S. Cl. .................. 715/753; 715/733; 715/751; 715/764; 715/765; 455/456.1; 455/457

(58) Field of Classification Search .......... 715/751, 715/753, 764, 765, 733; 455/456.1, 457; 709/204

See application file for complete search history.

(56) References Cited

U.S. PATENT DOCUMENTS

| | | | |
|---|---|---|---|
| 6,353,398 B1 | 3/2002 | Amin et al. | |
| 6,672,506 B2 | 1/2004 | Swartz et al. | |
| 6,741,188 B1 | 5/2004 | Miller et al. | |
| D494,584 S | 8/2004 | Schlieffers et al. | |
| 6,796,505 B2 | 9/2004 | Pellaumail et al. | |
| 6,823,190 B2 * | 11/2004 | Ford et al. | 455/456.3 |
| 6,837,436 B2 | 1/2005 | Swartz et al. | |
| 7,010,501 B1 | 3/2006 | Roslak et al. | |
| 7,035,618 B2 * | 4/2006 | Schnurr | 455/404.2 |
| 7,040,541 B2 | 5/2006 | Swartz et al. | |
| 7,063,263 B2 | 6/2006 | Swartz et al. | |
| 7,124,370 B2 * | 10/2006 | Fish | 715/741 |
| 7,171,378 B2 | 1/2007 | Petrovich et al. | |
| 7,195,157 B2 | 3/2007 | Swartz et al. | |
| 7,213,206 B2 * | 5/2007 | Fogg | 715/706 |
| 7,224,987 B1 | 5/2007 | Bhela et al. | |
| 7,350,365 B2 | 4/2008 | Kim et al. | |
| 7,385,501 B2 | 6/2008 | Miller et al. | |
| 7,412,400 B1 | 8/2008 | Bhela et al. | |
| 7,525,450 B2 | 4/2009 | Miller et al. | |
| 7,529,558 B1 * | 5/2009 | Blair et al. | 455/519 |
| 2001/0030664 A1 | 10/2001 | Shulman et al. | |
| 2002/0021307 A1 * | 2/2002 | Glenn et al. | 345/753 |

(Continued)

OTHER PUBLICATIONS

"System and Method for Providing Personal Location Information to a Location Services Server from a Location Device," U.S. Appl. No. 10/184,137, filed Jun. 27, 2002. Inventors: Stephen Lawler, Harvinder Bhela, and Rajesh Rao.

*Primary Examiner*—Steven P Sax
*Assistant Examiner*—Grant D Johnson
(74) *Attorney, Agent, or Firm*—Lee & Hayes, PLLC

(57) ABSTRACT

Various embodiments utilize a presence-based network to provide a suite of services that build upon the presence-based or instant messaging foundation. In at least some embodiments, the presence-based network is utilized to implement a number of location-aware applications. In at least some embodiments, as part of a user's presence information, their particular location is ascertained and made available to others on the presence-based network. Location can be a physical location or a logical location. Their particular physical location can be visually represented to others by, for example, displaying a map that indicates the user's location.

20 Claims, 6 Drawing Sheets

U.S. PATENT DOCUMENTS

| | | | |
|---|---|---|---|
| 2002/0026477 A1* | 2/2002 | Choi | 709/204 |
| 2002/0055926 A1* | 5/2002 | Dan et al. | 707/100 |
| 2002/0086676 A1* | 7/2002 | Hendrey et al. | 455/445 |
| 2002/0130904 A1* | 9/2002 | Becker et al. | 345/753 |
| 2004/0189701 A1* | 9/2004 | Badt, Jr. | 345/753 |
| 2004/0201500 A1 | 10/2004 | Miller et al. | |
| 2004/0203746 A1* | 10/2004 | Knauerhase et al. | 455/432.1 |
| 2005/0130634 A1* | 6/2005 | Godfrey | 455/414.1 |
| 2005/0181803 A1* | 8/2005 | Weaver et al. | 455/456.1 |
| 2005/0210102 A1* | 9/2005 | Johnson et al. | 709/204 |
| 2005/0266858 A1 | 12/2005 | Miller et al. | |
| 2006/0019676 A1 | 1/2006 | Miller et al. | |
| 2006/0046744 A1 | 3/2006 | Dublish et al. | |
| 2006/0194186 A1* | 8/2006 | Nanda | 434/350 |
| 2006/0223518 A1* | 10/2006 | Haney | 455/420 |
| 2006/0241859 A1* | 10/2006 | Kimchi et al. | 701/208 |
| 2006/0242581 A1* | 10/2006 | Manion et al. | 715/733 |
| 2007/0015519 A1* | 1/2007 | Casey | 455/456.2 |
| 2007/0197229 A1* | 8/2007 | Kalliola et al. | 455/456.1 |
| 2007/0203644 A1* | 8/2007 | Thota et al. | 701/211 |
| 2007/0204218 A1* | 8/2007 | Weber et al. | 715/530 |
| 2007/0255785 A1* | 11/2007 | Hayashi et al. | 709/204 |
| 2007/0255807 A1* | 11/2007 | Hayashi et al. | 709/219 |
| 2007/0281689 A1* | 12/2007 | Altman et al. | 455/435.1 |
| 2008/0090591 A1 | 4/2008 | Miller et al. | |
| 2008/0091537 A1 | 4/2008 | Miller et al. | |
| 2008/0161018 A1 | 7/2008 | Miller et al. | |

* cited by examiner

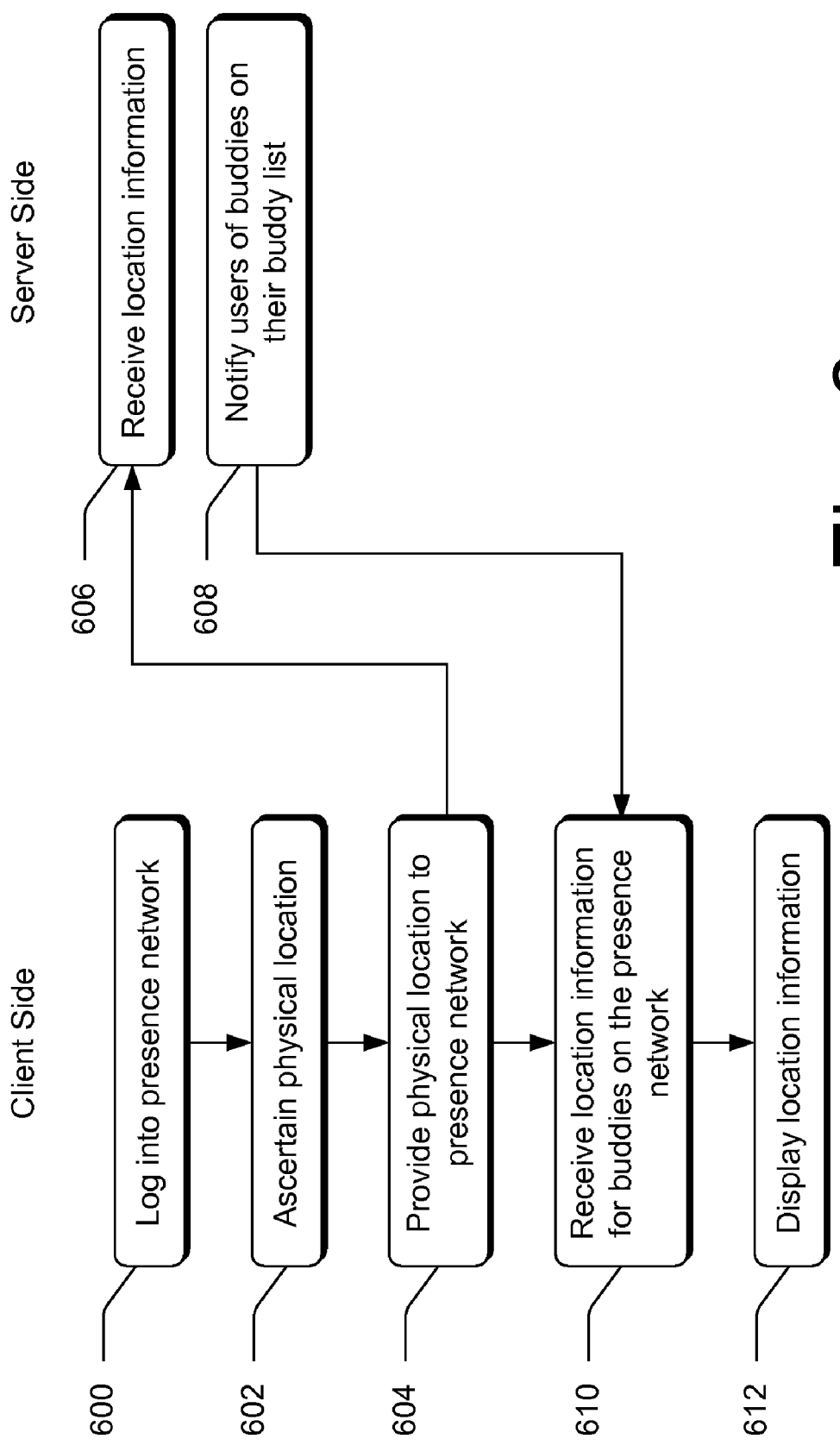

PRESENCE-BASED LOCATION AND/OR PROXIMITY AWARENESS

BACKGROUND

In a presence-based network, such as one that is used for instant messaging applications, so-called presence data is maintained by the network and includes such things as a user's status (e.g. away, out to lunch, logged in), songs that the user is currently listening to, the user's picture and the like. It would be desirable to provide additional information for a user to enhance the user's experience.

SUMMARY

Various embodiments utilize a presence-based network to provide a suite of services that build upon the presence-based or instant messaging foundation. In at least some embodiments, the presence-based network is utilized to implement a number of location-aware applications. In at least some embodiments, as part of a user's presence information, their particular location is ascertained and made available to others on the presence-based network. Location can be a physical location or a logical location. Their particular physical location can be visually represented to others by, for example, displaying a map that indicates the user's location.

In at least some other embodiments, location is used as a means to ascertain buddies or others that are "near" the user. Nearness can be manifest as geographical nearness, or more abstractly, as nearness with regard to some defined or definable abstract space. By knowing that others are "near" them, the user can take advantage of a number of features or applications that can enhance their experience.

BRIEF DESCRIPTION OF THE DRAWINGS

FIG. 6 is a flow diagram that describes steps in a method in accordance with one embodiment.

DETAILED DESCRIPTION

Overview

Figure 1:
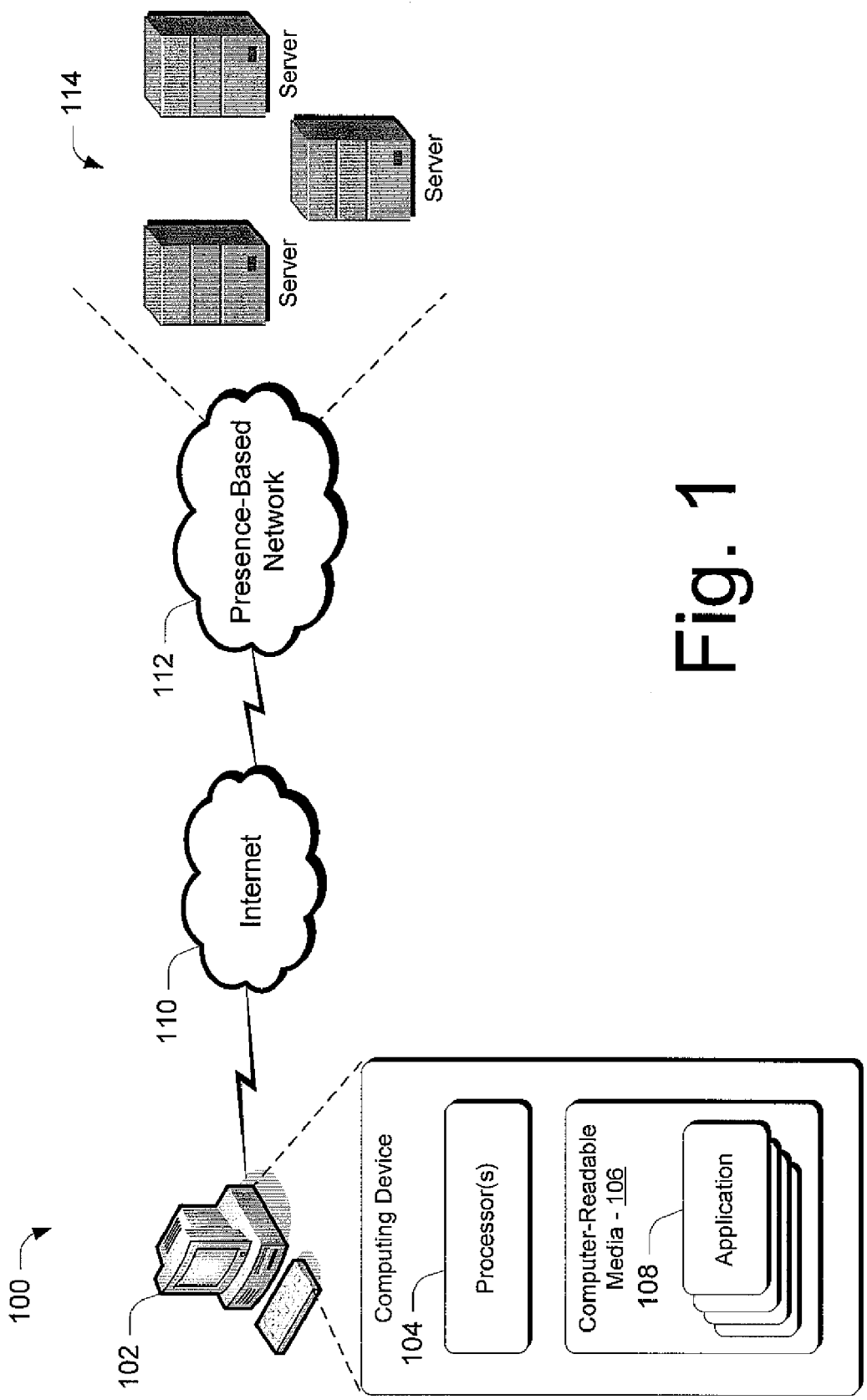
FIG. 1 illustrates a system that includes a presence-based network in accordance with one embodiment.

Various embodiments utilize a presence-based network to provide a suite of services that build upon the presence-based or instant messaging foundation. In at least some embodiments, the presence-based network is utilized to implement a number of location-aware applications. In at least some embodiments, as part of a user's presence information, their particular location is ascertained and made available to others on the presence-based network. Location can be a physical location or a logical location. Their particular physical location can be visually represented to others by, for example, displaying a map that indicates the user's location.

In at least some other embodiments, location is used as a means to ascertain buddies or others that are "near" the user. Nearness can be manifest as geographical nearness, or more abstractly, as nearness with regard to some defined or definable abstract space. By knowing that others are "near" them, the user can take advantage of a number of features or applications that can enhance their experience.

In the discussion that follows, the notion of a presence based network is first discussed to provide the reader who is unfamiliar with such networks some context for appreciating the described embodiments. Following this, a discussion of the inventive embodiments in the context of a presence based network is provided.

Presence in General

The notion of presence typically implies the use of a server or service that runs and keeps online users updated with each other's contacts' online status. That is, in a presence based network, users can identify so-called contacts or buddies— the same or similar to those that appear in the user's email address list. Whenever a contact or buddy is online, the presence based network notifies the user so that the user can leverage the services provided by the network—such as instant messaging, peer-to-peer file exchange and the like. That is, the presence based network can enable contacts that are online together to communicate in a real-time fashion.

One commercially-available software product that provides presence capabilities is Microsoft's Windows® Messenger, although other products are available. Microsoft's Windows® Messenger is a rich, integrated real-time communications experience in Windows® XP that enables people to effortlessly see, talk, work and play with friends, family and colleagues, whenever and however they choose using their personal computer. Windows® Messenger also includes presence and notification features to keep users updated when their contacts or buddies are online and let users know their current status.

Various embodiments described below can leverage the functionality provided by a presence-based network. It is to be appreciated and understood that Microsoft's Windows® Messenger constitutes but one exemplary application that can be utilized in this context. As such, other applications can be utilized without departing from the spirit and scope of the claimed subject matter.

Exemplary Presence-Based Network

As an example of a presence-based network in accordance with one embodiment, consider FIG. 1 which illustrates such a network or system generally at 100. System 100 includes one or more computing devices 102 each of which includes one or more processors 104, one or more computer-readable media 106 and one or more applications 108 that reside on the computer-readable media and which are executable by the processor(s). In at least one embodiment, one of the applications resides in the form of an instant messaging application, such as Microsoft's Windows® Messenger.

Although computing device 102 is illustrated in the form of a desktop computer, it is to be appreciated and understood that other computing devices can be utilized without departing from the spirit and scope of the claimed subject matter. For example, other computing devices can include, by way of example and not limitation, portable computers, handheld computers such as personal digital assistants (PDAs), cell phones and the like.

System 100 also includes a network, such as the Internet 110 that is used by computing device 102 to communicate with a presence-based network 112. Any suitable protocols can be utilized to enable communication between computing device 102 and presence based network 112.

As shown, presence-based network 112 includes one or more servers 114 that implement the presence environment, as will be appreciated by the skilled artisan. The presence-based network can be one that includes or supports the use of instant messaging, VoIP, voice clips and the like—all of which can permit a user of computing device 102 to communicate with the network and others. Instant messaging, VoIP and voice clip protocols will be understood by the skilled artisan and, for the sake of brevity, are not further described here.

Using Location Information Associated with a User's Buddies

Figure 2:
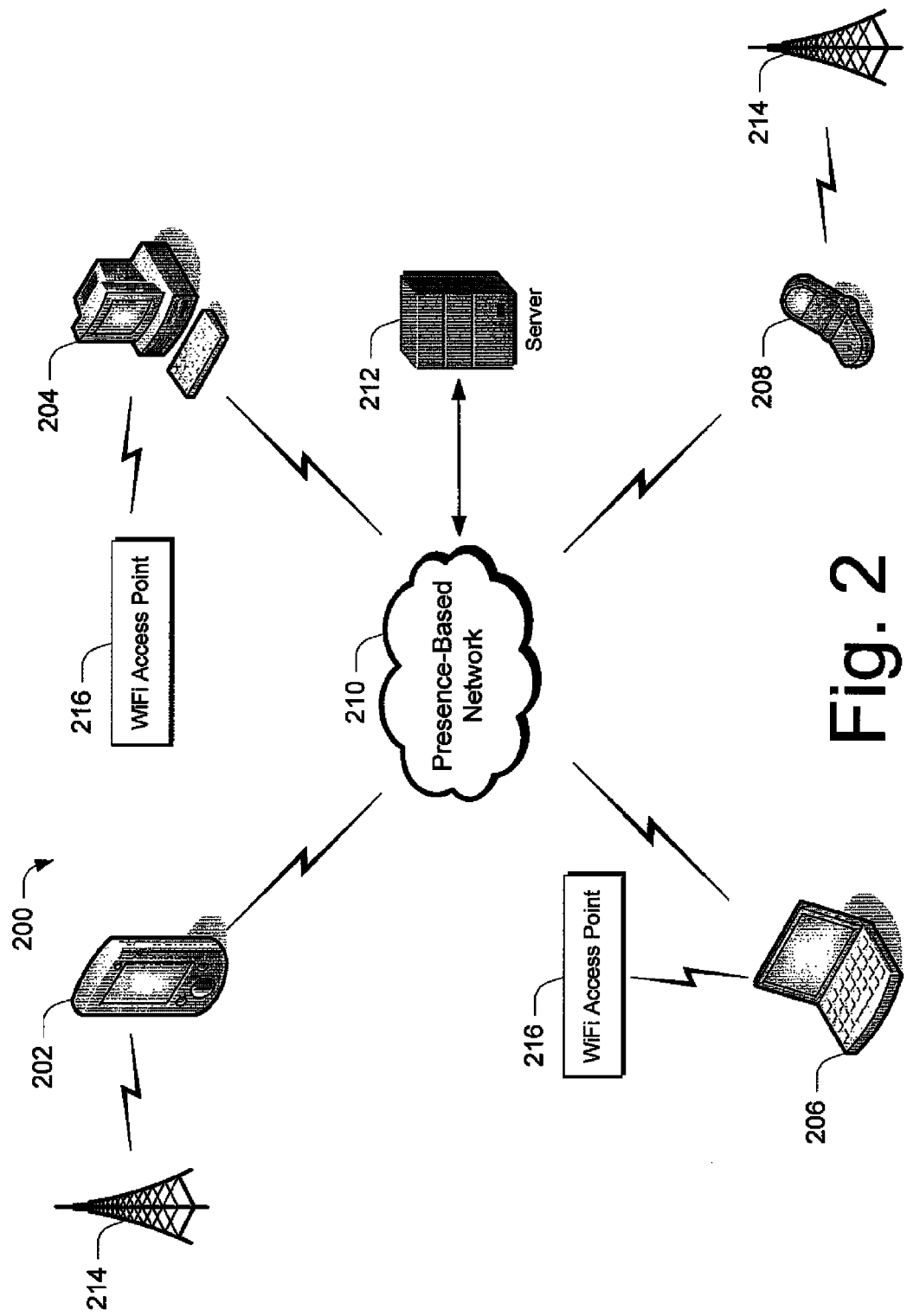
FIG. 2 illustrates an exemplary system in accordance with one embodiment.

FIG. 2 illustrates an exemplary system in accordance with one embodiment, generally at 200. In this particular example, system 200 includes a number of computing devices examples of which include a personal digital assistant (PDA) 202, a desktop computer 204, a laptop or notebook computer 206 and a cell phone 208. Although particular computing devices are illustrated, it is to be appreciated and understood that other computing devices can be utilized without departing from the spirit and scope of the claimed subject matter.

In addition, system 200 includes a presence-based network 210 that includes one or more servers 212 that can maintain a user's presence-based information, as described above. In this particular example, system 200 can also include a number of different types of instrumentalities for ascertaining the location of particular computing devices. In this example, the location that is ascertained is the physical location of the computing device. In the illustrated and described embodiment, the instrumentalities that can be utilized to ascertain a device's location include, by way of example and not limitation, cell towers 214 that can be used to compute a cellular location and/or WiFi access points 216 that can be used to ascertain the location of a device based on the signal strength of the wireless signal. Other means of determining location can be utilized without departing from the spirit and scope of the claimed subject matter. These other means include, by way of example and not limitation, Global Positioning Systems (GPS), physical beacons that broadcast the location of the beacon (e.g. Bluetooth or 802.11 beacons), and the like.

In operation, when a user logs onto the presence-based network using, for example, their instant messaging application, the location of their device is ascertained using any of the techniques mentioned above, as well as others that might not be mentioned above. Location need not, however, be determined only when the user logs on. Rather, location can be intermittently determined or determined responsive to a location change, independent of a user logging on to the presence-based network.

Once the location of the device has been ascertained, this location can be provided to the presence-based network 210 and maintained by server 212 as part of that particular user's presence information or status. Once this information has become part of the user's presence information, the information can be shared out amongst the user's contacts or buddies so their buddies can learn of the user's location. Thus, in the FIG. 2 example, once the PDA 202, desk top device 204, laptop 206 and cell phone 208 determine their respective locations, this information can be provided to the presence network and shared out amongst a user's buddies.

It is to be appreciated and understood that this information can be directly shared with the presence network or more indirectly shared. For example, a user may have their cell phone 208 and may go to the park. In this case the cell phone, by virtue of its proximity to a particular cell node or nodes, knows its location. The cell phone can either directly notify the presence network of its new location or, alternately, it can notify another computing device with which it has communication, such as desktop device 204. Either way, this location information can be provided to the presence network and utilized as described above and below.

Figure 3:
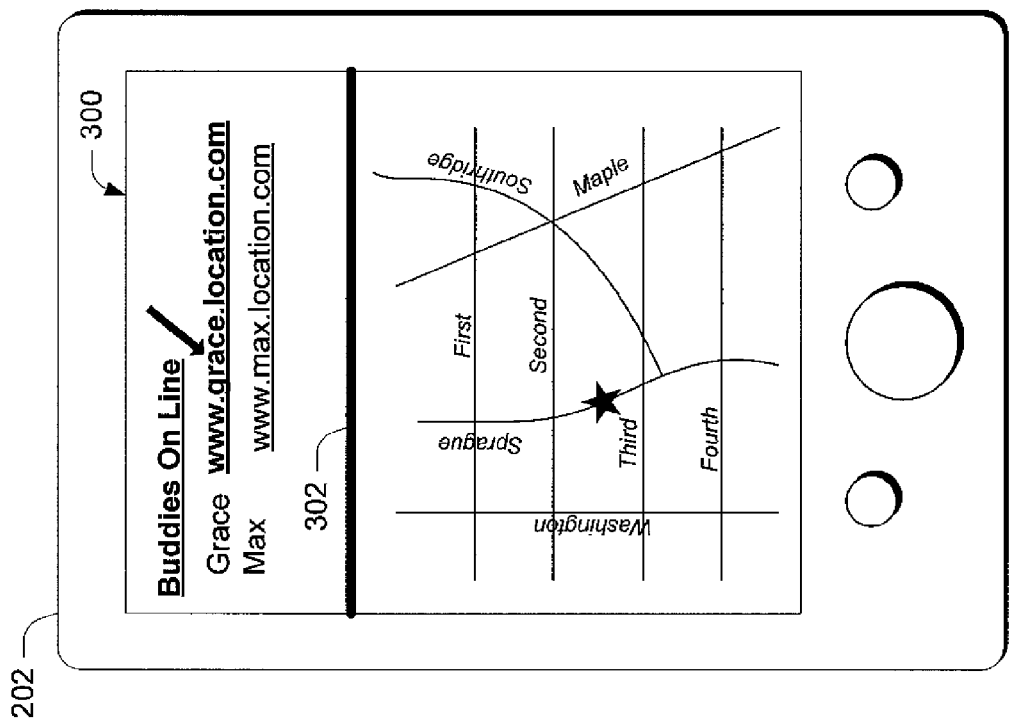
FIG. 3 illustrates a computing device having a user interface in accordance with one embodiment.

This information can be shared and represented to the user's buddies in any suitable fashion. As an example, consider FIG. 3.

There, assume that a user of PDA 202 has logged onto their device and into the presence network. When they log in, a suitable user interface, such as user interface 300, can be presented and a list of their buddies that are on line can be presented to them. In this particular example, two of the user's buddies are logged in—Grace and Max. In addition, each of Grace's and Max's locations were previously determined and maintained as part of their presence information. When the user of PDA 202 logs in, they receive, along with the other typical presence information, information about the location of their buddies that are on line. This information might be presented in the form of a general textual display of the buddy locations, e.g. "Grace is in Spokane on Sprague, between Second and Third." Alternately or additionally, the address nearest Grace's location might be displayed. Alternately or additionally, a link can be presented to the user on which they can click and, responsively, have a map displayed with indicia that indicates the location of the buddy on whom they clicked. When the user clicks on the link, the link might directly access a map that can be displayed for the user. Alternately or additionally, the link might access a third party service that receives the associated location information and returns, to the PDA 202, a map with suitable indicia displayed for the user. The map can be returned using any suitable protocols and may assume any suitable form. For example, the map might be described in HTML or XML that is sent to the computing device.

In this particular example, the user has clicked on "Grace" and a map 302 is presented which includes a star at Grace's approximate location.

By knowing Grace's location, the user can now take advantage of this information to further their experience. For example, if Grace happens to be close to the user, the user might text message Grace to see if she wants to meet for a cup of coffee or a slice of pizza. Alternately or additionally, the user might execute a search for restaurant locations closest between Grace and the user and suggest meeting there for lunch. It is to be appreciated and understood that suitable search fields can be presented to allow the user to execute a wide variety of searches that leverage the location information that is shared as part of the presence network.

In at least some embodiments, the user can define a group in their instant messaging client that can be used to automatically display all buddies that are near them. For example, the user can define a group "Near Me" and set parameters that are used to ascertain physical (or logical) nearness. For example, a user might define nearness to be "within 1-mile". Now, whenever any of their buddies come within a mile of them, the buddy is automatically included in the "Near Me" group. Accordingly, if a user pulls up the "Near Me" group, at any particular time, they can view or otherwise learn of the buddies that are near them. Alternately or additionally, an automatic notification can be generated so that the user can be notified when a buddy is within the nearness distance that they have defined.

Figure 4:
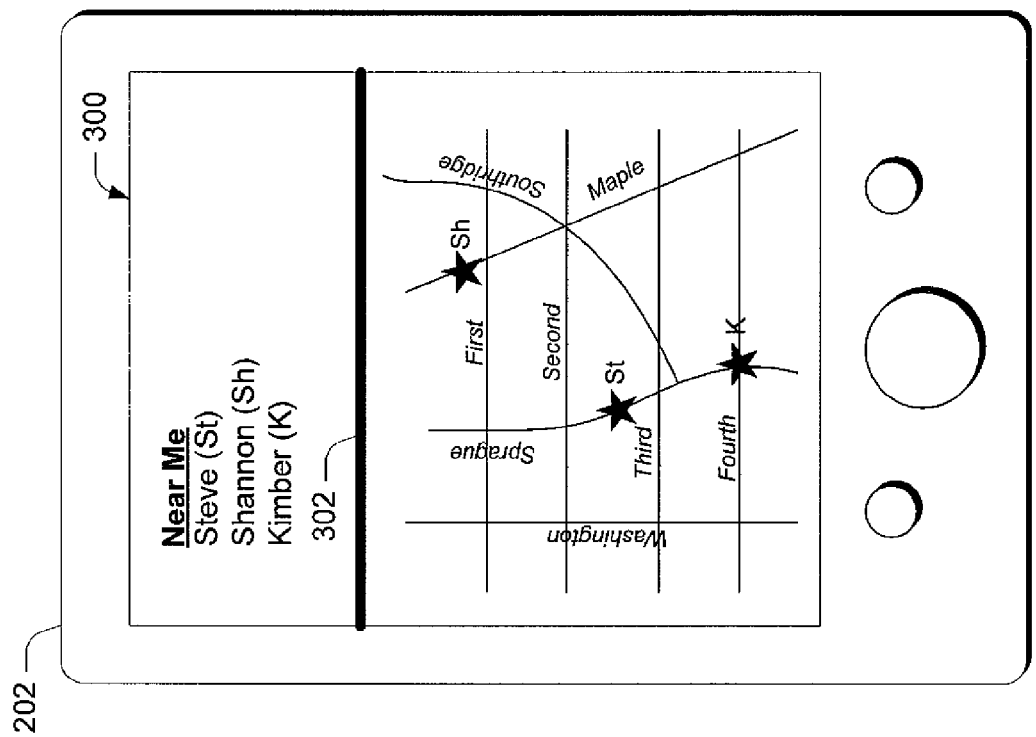
FIG. 4 illustrates a computing device having a user interface in accordance with one embodiment.

As an example, consider FIG. 4 which illustrates PDA 202 in the "Near Me" mode. Here, three of the user's buddies—Steve, Shannon and Kimber are located near the user. Accordingly, by clicking on the "Near Me" button or link, a map is presented to the user and plots the locations of the buddies that are near them. Here, the user can take advantage of the search capabilities described above to conduct a variety of searches that are designed at enhancing the socializing between and amongst the buddies that are near them.

Named Locations

In at least some embodiments, the notion of a named location can be utilized. A named location is a location which has acquired a name that can be presented on a map that is displayed for the user. For example, a named location might be "Joe's Diner" or "Red West Conference Room 2010". Now, when a map is displayed for the user that includes a named location, that location appears in a named fashion for the user. In some embodiments, various other information associated with that location might be presented to the user—such as advertisements and the like.

Figure 5:
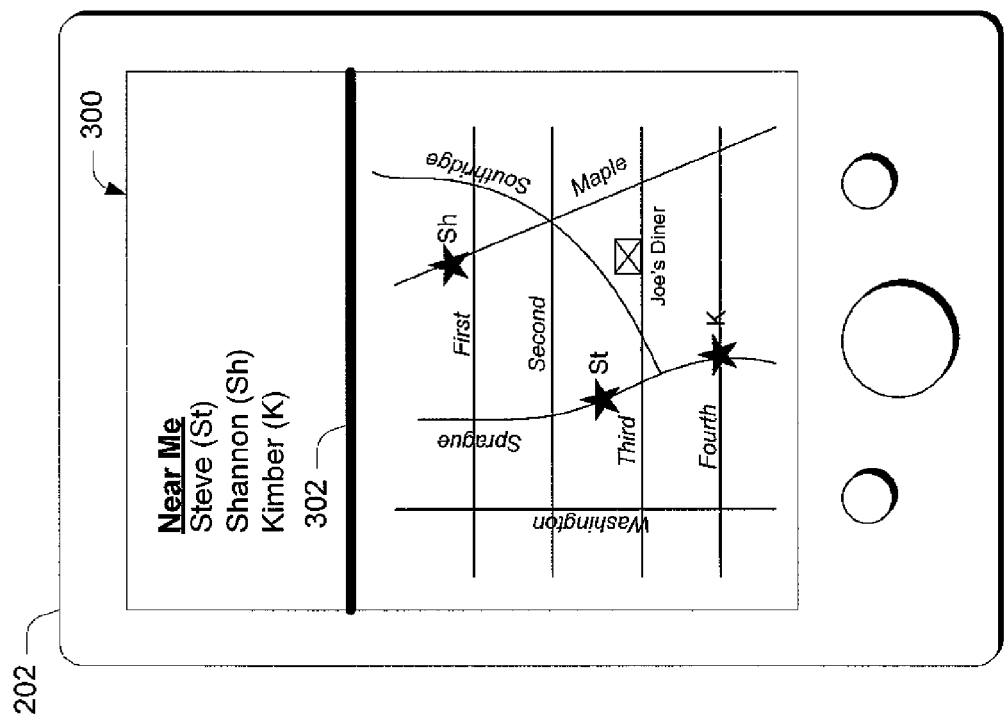
FIG. 5 illustrates a computing device having a user interface in accordance with one embodiment.

As an example, consider FIG. 5 which shows the FIG. 4 display with a named location—Joe's Diner. In this example, the user might text message their friends and suggest that they meet at Joe's for lunch. If Shannon does not have a map-enabled device, the user might tell Shannon to go south on Maple and turn right on Third to get to Joe's. In this way, users of the presence network can not only learn which of their buddies is near them, but, by virtue of named locations, can take advantage of the context of their surroundings in a much more informative and robust way.

Using Location Information when an Individual's Precise Location cannot be Determined There are instances when an individual's location cannot, for whatever reason, be precisely determined. For example, users who rely on a WiFi access point to determine their location may not be able to have their location precisely determined such that it can be plotted on a map. In instances such as these, the user's instant messaging client can make this somewhat imprecise location information available to the presence network and have it shared with their buddies. Software executing on their buddies' devices can use this location information, along with information about their own location, to ascertain an approximate distance between the buddies.

For example, when a WiFi access point is shared between buddies, by using the signal strengths associated with the individual signals at each of the clients, software executing on the client devices can ascertain a relative distance approximation as between the buddies. Other methods can be used as well, such as various triangulation methods that use triangulation between various information beaconing towers.

Pre-filling Contact Information with Location Information

In at least some embodiments, a user's contact information can be pre-filled automatically with a current address associated with the location of a buddy. For example, once a buddy's location is ascertained through whatever means, an address associated with that location can be maintained as part of the buddy's presence information. As such, this presence information that includes a current address can be sent to the user and used to automatically fill in fields associated with this buddy's current address.

Using Places as Contacts in a Messaging System

In at least some embodiments, individual places or locations can be represented as so-called first-class entities in a messaging system. That is, places or locations may be thought of as having a presence such that presence information that is maintained for the place or location can describe properties associated with the place or location. For example, a particular conference room can have a presence in the presence network. Presence information associated with the place or location might include, by way of example and not limitation, whether it is currently booked for a meeting, the number of people present in the conference room, resources available and the like.

By virtue of having a presence in the presence network as well as being considered a first-class entity, messages can be sent through the instant messaging system to the place or location. Accordingly, those individuals who are at the particular location can then receive the messages that are sent to the place. As another example, a user at a particular sporting event might send a message to the sports stadium to find any of their buddies that are at the location. By knowing the location of the user as well as the user's buddies, the presence network can see that the message is provided to any of the user's buddies who are at the sports stadium.

In addition, by considering places or locations as entities in the messaging system, the messaging application can be integrated with other applications in convenient ways. For example, a user may be trying to set up a meeting using meeting request software. The meeting request software may communicate with the messaging application to ascertain the user's location and, responsively, find the nearest available conference room. In this manner, location can be exposed programmatically for use by other applications.

Tagging Communications with Location

In at least some embodiments, communications that originate with a particular user can be tagged with the location from which that communication originated. For example, a user may initiate a blog from within their instant messaging application and post it to their particular space. When the blog is posted, it can be tagged with the location from which the blog originated (such as the airport or Joe's cafe). Other communications can be tagged as well, such as instant messages to others, email communications to others, VoIP communications and the like. By tagging these and other types of communications, an easily indexed and searchable feature is provided. For example, at some point in the future, a user may wish to search for all messages received from Pittsburgh or Chicago because they recall receiving a particular message of interest from one of those locations.

Exemplary Method

FIG. 6 is a flow diagram that describes steps in a method in accordance with one embodiment. The method can be implemented in connection with any suitable hardware, software, firmware or combination thereof. In but one embodiment, aspects of the method can be implemented by a suitably programmed instant messaging application using a presence-based network. As such, those acts or steps that are performed by an instant messaging application are designed as "Client Side", while those steps that are implemented by the presence-based network are designated as "Server Side".

Step 600 logs into a presence network. This step can be accomplished in any suitable way. Typically, this step is accomplished by a user entering their user name and password into a suitable user interface. Step 602 ascertains the physical location of the user's computing device. This step can be accomplished in any suitable way. For example, the computing device can determine its location or be otherwise provided with an indication of its location using any suitable way and technology, examples of which are provided above. In addition, a user can enter their physical location into a suitable user interface on the device. Step 604 provides the physical location to a presence-based network. This act or step can be accomplished in any suitable way using any suitable protocol.

Step 606 receives, with the presence network, location information that can be provided by multiple different users. When the location information is received, the presence network organizes and maintains such information for subsequent use. Step 608 notifies users of the locations of buddies on their buddy list. Here, the presence network can keep a list of all of the individuals who are logged on, their locations and the locations of their buddies. The presence network can then notify the users of the locations of their buddies in any suitable way. For example, the presence network might simply generate a textual message that indicates that a particular buddy is at a particular location. Alternately or additionally, the presence network can notify the users in a manner which allows the users to further receive and have displayed a visual display or map that shows them where their particular buddies are at any one time. Examples of how this can be done are given above.

Step 610 receives location information for buddies that are on the presence network and step 612 displays the information for a user. Examples of how this can be done are given above.

Using Location Awareness to Compute "Nearness"

As noted above, the notion of location is used as a means to ascertain nearness. As we saw above, nearness can be manifest as physical nearness or proximity. Nearness can also be manifest more abstractly as nearness with regard to some defined or definable abstract space. This abstract space can be multi-dimensional and can really include dimensions that are defined in any suitable space. For example, dimensions can be defined for user interests, age, education level, classes enrolled in, music likes and dislikes, and the like. In this sense, location can be thought of as a logical location.

Using this measure of nearness, a suitably programmed device using a presence network can compute logical nearness and then display, for the user, those users that meet whatever criteria that the user has defined. Accordingly, as part of an individual user's presence information, information pertaining to the user's individual mapping within the abstract space can be maintained. Using this information, the user can be informed of others that reside in a similar location within the abstract space. It should be appreciated and understood that this notion can apply to users that do not necessarily appear on a user's buddy list. For example, a new student at college may enter into their presence information the particular classes that they have taken. The university may have a plug-in module which is downloadable and that plugs into the client application and which is programmed to compute distance in an abstract space that includes a class dimension, a dorm dimension and an age dimension. The user can thus, through the university's plug-in, ascertain those individuals in their dorm with whom they share classes and who are near in age to the user.

The example just above highlights an interesting feature that can be used to extend the inventive concepts into this abstract space. That is, various third party developers can develop their own abstract spaces and define various dimensions within the abstract spaces. By developing plug-in modules that are programmed to work within these abstract spaces with an appreciation of the various dimensions, integration with the presence network can provide a user experience that is extremely flexible and robust and, in a sense, highly adaptable to ever-evolving new abstract spaces. By leveraging the presence network as a mechanism to maintain, organize and make available this presence information, users can have an opportunity to leverage and exploit their locations (both physical and logical) in ways never before available.

The plug-in modules also provide a way for developers to enable physical locations to be determined in a manner which is outside the purview of the client messenger application. For example, a plug-in module might be designed for some new technology that determines location in a manner that was not contemplated by the messenger application. Yet, the actual determined location, however determined, can be provided to the device and the presence network for use as described above. Hence, plug-ins provide a flexible way for the inventive system to be extensible.

In at least some embodiments, the notion of physical location can be integrated with the notion of a logical location to provide an even more robust experience. For example, a user at a Seattle Seahawks game (when the Seahawks are playing the Steelers) might define parameters that effectively asks for a display of users within 20 meters who are Steelers fans. In this way, the user might be able to text message users who are physically and logically proximate the user.

CONCLUSION

Various embodiments utilize a presence-based network to provide a suite of services that build upon the presence-based or instant messaging foundation. In at least some embodiments, the presence-based network is utilized to implement a number of location-aware applications. In at least some embodiments, as part of a user's presence information, their particular location is ascertained and made available to others on the presence-based network. Location can be a physical location or a logical location. Their particular physical location can be visually represented to others by, for example, displaying a map that indicates the user's location.

In at least some other embodiments, location is used as a means to ascertain buddies or others that are "near" the user. Nearness can be manifest as geographical nearness, or more abstractly, as nearness with regard to some defined or definable abstract space. By knowing that others are "near" them, the user can take advantage of a number of features or applications that can enhance their experience.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A computer-implemented method comprising:

logging on to a presence-based network by a user using a computing device including a processor executing instructions stored in a computer-readable storage media, the processor being configured by the instructions for implementing an instant messaging application used to perform the logging on;

ascertaining a physical location of the computing device provided to the presence-based network;

defining a group to which the user belongs, said group being defined by the instant messaging application for automatically identifying members of the group to the user when the members are logged on to the presence-based network, wherein the presence-based network determines location information associated with one or more members of the group who are logged onto the presence-based network;

identifying a plurality of physical places as contacts in the instant messaging application, the user able to send messages addressed to the plurality of physical places identified as contacts using the instant messaging application; and sending a message from the computing device addressed to a particular one of the physical places identified as a contact by the instant messaging application, those members of the group determined by the presence-based network to be at a location of the particular physical place receiving the message through the presence-based network, and members of the group determined by the presence-based network to not be at the location of the particular physical place not receiving the message, the computing device not necessarily being at the location of the particular physical place.

2. The method of claim 1, further comprising receiving, via the presence-based network, presence information associated with the physical places, wherein the presence information associated with the physical places includes one or more of identity of individuals present at the physical place, number of individuals present at the physical place, availability of the physical place, and resources available at the physical place.

3. The method of claim 2, wherein the physical place is a conference room and the availability of the particular physical place includes whether or not the conference room is currently booked.

4. The method of claim 1, further comprising:
visually representing, by the instant messaging application on a map on the computing device, logical locations associated with one or more members of the group who are logged onto the presence-based network, wherein the visually representing of logical locations is further responsive to at least one user-defined logical proximity parameter that defines logical proximity, wherein logical proximity is manifest abstractly with regard to an abstract space,
wherein the instant messaging application includes a module that is programmed to compute logical proximity in the abstract space,
wherein the user-defined logical proximity parameter that defines logical nearness is based on a user's interest.

5. The method of claim 4, further comprising viewing the members of the group in a list on the computing device, wherein the members of the group are listed in order of proximity to the computing device based on location information from the presence-based network.

6. The method of claim 1, further comprising:
identifying a current address of a particular one of the one or more members of the group based on a physical location of the particular member of the group determined from the presence-based network;
pre-filling contact information fields of the user automatically with the identified current address based on the physical location of the particular member for maintaining the address in the contact information as part of presence information for the particular member.

7. The method of claim 1, further comprising defining a logical proximity parameter and a nearness parameter for displaying on a map members of the group who are both physically and logically proximate to the user, wherein the logical proximity parameter is defined according to an interest of the user.

8. The method of claim 7, further comprising:
tagging communications that originate from the computing device by tagging the communications with the ascertained physical location from which the communications originate,
wherein the user initiates a blog for posting to a particular space while at the ascertained physical location, and
wherein the blog is tagged with the physical location from which the blog was initiated when the blog is posted.

9. The method of claim 8, further comprising searching communications originated from the user based upon the tagged physical location.

10. The method of claim 1, further comprising tagging one or more instant messages from the computing device with the physical location ascertained for the computing device when the instant messages originate from the computing device at the ascertained physical location.

11. A computer-implemented method comprising:
receiving, at one or more servers via a presence-based network and at least in part responsive to a user being logged into the presence-based network, location information associated with multiple users of the presence-based network, said location information being ascertained based upon detected locations of respective computing devices of the multiple users;
maintaining said location information by the one or more servers;
maintaining, by the one or more servers, buddy list information for recognizing users belonging to a particular buddy list as being members of a particular group of users;
receiving, via the presence-based network, presence information associated with a physical place, the physical place being identified to the presence-based network as an entity for receiving messages sent to the physical place;
receiving at the one or more servers a message from one of the users comprising the particular buddy list, the message being sent by the user addressed to the physical place identified to the presence-based network as an entity able to receive messages, the message sent addressed to the physical place regardless of a physical location of the user sending the message; and
delivering the message to the users on the particular buddy list whose location information on the presence-based network corresponds to the physical place, and not delivering the message to the users on the particular buddy list whose location information does not correspond to the physical place.

12. The method of claim 11, wherein the presence information associated with the physical place includes one or more of identity of individuals present at the physical place, number of individuals present at the physical place, availability of the physical place, and resources available at the physical place.

13. The method of claim 12, wherein the physical place is a conference room and the availability of the physical place includes whether or not the conference room is currently booked.

14. The method of claim 11, further comprising intermittently updating the location information based upon the detected locations of the respective computing devices of the multiple users determined from the presence-based network.

15. One or more computer-readable storage media comprising computer executable instructions implemented by one or more processors for directing a computing device to:
ascertain a physical location of the computing device;
receive, via a presence-based network, location information associated with physical locations of one or more other computing devices of one or more other individuals who use the presence-based network, the one or more other individuals and a user of the computing device being members of a predefined group;
receive, via the presence-based network, presence information associated with a first physical place, the first physical place being recognized as a contact in a messaging system for enabling messages to be addressed to the first physical place as the contact; and
send a message, using the messaging system, addressed to the first physical place as the contact for receiving the message, the individuals in the predefined group whose location information on the presence-based network corresponds to the first physical place receiving the message, while the individuals in the predefined group whose location information on the presence-based network does not correspond to the first physical place do not receive the message, the message being sent from a second physical place different from the first physical place.

16. The one or more computer readable storage media of claim 15 further comprising computer executable instructions for directing the computing device to:

visually represent, on the computing device and in response to user-defined criteria that describes a logical location, one or more individuals within the predefined group that are within a predefined proximity to the logical location.

17. The one or more computer readable storage media of claim 15 further comprising computer executable instructions for directing the computing device to:

receive a definition of a nearness parameter from the user to be applied to the individuals for determining when the individuals are near to the user, wherein the nearness parameter is defined so that when one of the individuals is within a predefined distance of the physical location of the computing device, an automatic notification is generated to notify the user that the individual is within the predefined distance.

18. The one or more computer readable storage media of claim 17 further comprising computer executable instructions for directing the computing device to:

visually represent, on the computing device, one or more physical locations associated with said one or more individuals, respectively, when the physical location of the individual is within a predefined distance of the physical location of the computing device and a logical location of the individual is within a predefined logical proximity to a logical location of the user.

19. The one or more computer readable storage media of claim 15, further comprising computer executable instructions for directing the computing device to:

present a map to the user on the computing device, said map plotting the physical location of the user and plotting the physical location of a particular one of the individuals; and present search fields with the map for identifying a meeting location between the user and the particular one of the individuals based on the determined physical location of the computing device and the determined physical location of the particular one of the individuals.

20. The one or more computer readable storage media of claim 15, wherein the presence information associated with the first physical place includes one or more of identity of individuals present at the physical place, number of individuals present at the physical place, availability of the physical place, and resources available at the physical place.

* * * * *